(12) United States Patent
Godin

(10) Patent No.: US 11,516,698 B2
(45) Date of Patent: Nov. 29, 2022

(54) SENDING A DUPLICATE OF AN ORIGINAL DATA PACKET TO A TARGET DEVICE IN A NETWORK

(71) Applicant: NOKIA TECHNOLOGIES OY, Espoo (FI)

(72) Inventor: Philippe Godin, Versailles (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/864,387

(22) Filed: May 1, 2020

(65) Prior Publication Data
US 2020/0351701 A1   Nov. 5, 2020

(30) Foreign Application Priority Data
May 2, 2019   (WO) ................. PCT/EP2019/061288

(51) Int. Cl.
*H04W 76/12*   (2018.01)
*H04W 28/02*   (2009.01)
(Continued)

(52) U.S. Cl.
CPC ....... *H04W 28/0268* (2013.01); *H04L 1/1642* (2013.01); *H04W 28/06* (2013.01); *H04W 76/12* (2018.02)

(58) Field of Classification Search
CPC . H04W 28/0268; H04W 76/12; H04W 28/06; H04W 28/02; H04W 76/22;
(Continued)

(56) References Cited

U.S. PATENT DOCUMENTS

| 2006/0209783 A1 | 9/2006 | Jain et al. |
| 2009/0016366 A1 | 1/2009 | Endo et al. |

(Continued)

FOREIGN PATENT DOCUMENTS

| CN | 105376165 A | 3/2016 |
| JP | 4519159 B2 | 8/2010 |

(Continued)

OTHER PUBLICATIONS

International Search Report and Written Opinion for Application No. PCT/EP2019/061288 dated Jan. 20, 2020, 13 pages.

(Continued)

*Primary Examiner* — Lakeram Jangbahadur
(74) *Attorney, Agent, or Firm* — Alston & Bird LLP

(57) ABSTRACT

An apparatus and method are provided for sending a first data packet comprising a Quality of Service (QoS) data flow identifier indicating a QoS data flow which the first data packet belongs to, and a data flow sequence number indicating a position of the first data packet in a sequence of the QoS data flow. A second data packet that is a duplicative of the first data packet is sent in a second QoS data flow, and has a sequence number that is incremented from that of the first data packet. The duplicative packets are transmitted via a first tunnel for transmitting the first QoS flow and a second tunnel for transmitting the second QoS flow. Reliability of such data transmission may therefore be improved. The duplication and sequencing may be implemented in the downlink and/or uplink direction.

13 Claims, 10 Drawing Sheets

(51) Int. Cl.
  *H04L 1/16* (2006.01)
  *H04W 28/06* (2009.01)
(58) Field of Classification Search
  CPC .... H04W 28/0967; H04L 1/1642; H04L 1/08;
  H04L 1/1621; H04L 1/1628
  See application file for complete search history.

(56) References Cited

U.S. PATENT DOCUMENTS

| | | | | |
|---|---|---|---|---|
| 2018/0097657 A1* | 4/2018 | Dao | .................. | H04L 47/12 |
| 2018/0367288 A1* | 12/2018 | Vrzic | .............. | H04W 36/0069 |
| 2019/0253917 A1* | 8/2019 | Dao | ................ | H04W 28/0268 |
| 2019/0357076 A1* | 11/2019 | Han | ................ | H04W 28/0268 |
| 2020/0022213 A1* | 1/2020 | Han | .................... | H04L 1/1642 |
| 2020/0145876 A1* | 5/2020 | Dao | ...................... | H04W 4/24 |
| 2021/0014925 A1* | 1/2021 | Li | ......................... | H04L 67/14 |
| 2021/0022040 A1* | 1/2021 | Zhu | ......................... | H04L 1/22 |

FOREIGN PATENT DOCUMENTS

| | | | |
|---|---|---|---|
| TW | I332336 B | 10/2010 | |
| WO | WO 2016/020727 A1 | 2/2016 | |
| WO | WO-2016020727 A1 * | 2/2016 | ......... H04L 12/4633 |

OTHER PUBLICATIONS

*Supporting Two NG-U Tunnels for a Single PDU Session*, R3-191497, 3GPP TSG-RAN WG3 # 103bis (Apr. 2019) 4 pages.
3GPP TR 23.725 V16.1.0, $3^{rd}$ Generation Partnership Project; Technical Specification Group Services and System Aspects; Study on Enhancement of Ultra-Reliable Low-Latency Communication (URLLC) Support in the 5G Core Network (5GC) (Release 16) (Mar. 2019) 91 pages.
3GPP TS 38.415 V15.2.0, $3^{rd}$ Generation Partnership Project; Technical Specification Group Radio AccessNetwork; NG-RAN; PDU Session User Plane Protocol (Release 15) (Dec. 2018) 12 pages.
3GPP TS 29.281 V15.5.0, $3^{rd}$ Generation Partnership Project; Technical Specification Group Core Network and Terminals; General Packet Radio System (GPRS) Tunnelling Protocol User Plane (GTPv1-U) (Release 15) (Dec. 2018) 32 pages.
First Examination Report for Indian Application No. 202147054814 dated Apr. 26, 2022, 9 pages.

* cited by examiner

S801 — Sending a first data packet, the first data packet comprising: a data flow identifier indicating a data flow which the first data packet belongs to; and a data flow sequence number indicating a position of the first data packet in a sequence of the data flow

Figure 8

S901 | Receiving a first data packet, the first data packet comprising: a data flow identifier indicating a data flow which the first data packet belongs to; and a data flow sequence number indicating a position of the first data packet in a sequence of the data flow

Figure 9

SENDING A DUPLICATE OF AN ORIGINAL DATA PACKET TO A TARGET DEVICE IN A NETWORK

CROSS-REFERENCE TO RELATED APPLICATIONS

This application claims priority to International Application No. PCT/EP2019/061288, filed May 2, 2019, the entire contents of which are incorporated herein by reference.

FIELD

This disclosure relates to sending and receiving information in a communications network. More particularly, the present disclosure relates to an apparatus, method and computer program for reliable sending and receiving of data.

BACKGROUND

Reliability of successful data transmission can be improved by sending a duplicate of an original data packet as well as the original data packet to a target device in a network. Such data transmission techniques include redundant data transmission. Nevertheless there may still be problems if an original data packet or its duplicate is not sent to or received properly at the target device.

SUMMARY

According to a first aspect there is provided an apparatus comprising means for performing: sending a first data packet comprising: a data flow identifier indicating a data flow which the first data packet belongs to; and a data flow sequence number indicating a position of the first data packet in a sequence of the data flow.

According to some examples, the means are further configured to perform: sending a duplicate of the first data packet, wherein the duplicate of the first data packet comprises a same data flow identifier and a same data flow sequence number as the first data packet.

According to some examples, the first data packet and the duplicate of the first data packet are sent over different data tunnel streams.

According to some examples, the first data packet comprises a Sequence Number Presence field.

According to some examples, the different data tunnel streams are different General Packet Radio Service Tunnelling Protocol streams.

According to some examples, the data flow is a Quality of Service flow.

According to some examples, the sending the data packet comprises sending a data packet in a downlink direction.

According to some examples, the sending the data packet comprises sending a data packet in an uplink direction.

According to some examples, the means are further configured to perform: incrementing the data flow sequence number when sending a next data packet in the data flow, such that a data flow sequence number of a second data packet which is next in the data flow following the first data packet is one greater than the data flow sequence number of the first data packet.

According to some examples, the means are further configured to perform: sending a duplicate of the second data packet, wherein the duplicate of the second data packet comprises a same data flow identifier and a same data flow sequence number as the second data packet.

According to some examples, the apparatus comprises a Radio Access Network node and the sending is towards a User Plane Function.

According to some examples, the apparatus comprises a User Plane Function and the sending is towards a Radio Access Network node.

According to some examples, the apparatus comprises a first User Plane Function and the sending is towards a second User Plane Function.

According to some examples, a plurality of data packets are sent from at least two data flows.

According to some examples, the at least two data flows are Quality of Service flows.

According to a second aspect there is provided an apparatus comprising at least one processor; and at least one memory including computer program code; the at least one memory and the computer program code configured to, with the at least one processor, cause the apparatus at least to perform: sending a first data packet comprising: a data flow identifier indicating a data flow which the first data packet belongs to; and a data flow sequence number indicating a position of the first data packet in a sequence of the data flow.

According to some examples, the at least one memory and the computer program code are configured to, with the at least one processor, cause the apparatus at least to perform: sending a duplicate of the first data packet, wherein the duplicate of the first data packet comprises a same data flow identifier and a same data flow sequence number as the first data packet.

According to some examples, the first data packet and the duplicate of the first data packet are sent over different data tunnel streams.

According to some examples, the first data packet comprises a Sequence Number Presence field.

According to some examples, the different data tunnel streams are different General Packet Radio Service Tunnelling Protocol streams.

According to some examples, the data flow is a Quality of Service flow.

According to some examples, the sending the data packet comprises sending a data packet in a downlink direction.

According to some examples, the sending the data packet comprises sending a data packet in an uplink direction.

According to some examples, the at least one memory and the computer program code are configured to, with the at least one processor, cause the apparatus at least to perform: incrementing the data flow sequence number when sending a next data packet in the data flow, such that a data flow sequence number of a second data packet which is next in the data flow following the first data packet is one greater than the data flow sequence number of the first data packet.

According to some examples, the at least one memory and the computer program code are configured to, with the at least one processor, cause the apparatus at least to perform: sending a duplicate of the second data packet, wherein the duplicate of the second data packet comprises a same data flow identifier and a same data flow sequence number as the second data packet.

According to some examples, the apparatus comprises a Radio Access Network node and the sending is towards a User Plane Function.

According to some examples, the apparatus comprises a User Plane Function and the sending is towards a Radio Access Network node.

According to some examples, the apparatus comprises a first User Plane Function and the sending is towards a second User Plane Function.

According to some examples, a plurality of data packets are sent from at least two data flows.

According to some examples, the at least two data flows are Quality of Service flows.

According to a third aspect there is provided an apparatus comprising: circuitry for: sending a first data packet comprising: a data flow identifier indicating a data flow which the first data packet belongs to; and a data flow sequence number indicating a position of the first data packet in a sequence of the data flow.

According to a fourth aspect there is provided a method comprising: sending a first data packet comprising: a data flow identifier indicating a data flow which the first data packet belongs to; and a data flow sequence number indicating a position of the first data packet in a sequence of the data flow.

According to some examples, the method comprises: sending a duplicate of the first data packet, wherein the duplicate of the first data packet comprises a same data flow identifier and a same data flow sequence number as the first data packet.

According to some examples, the first data packet and the duplicate of the first data packet are sent over different data tunnel streams.

According to some examples, the first data packet comprises a Sequence Number Presence field.

According to some examples, the different data tunnel streams are different General Packet Radio Service Tunnelling Protocol streams.

According to some examples, the data flow is a Quality of Service flow.

According to some examples, the sending the data packet comprises sending a data packet in a downlink direction.

According to some examples, the sending the data packet comprises sending a data packet in an uplink direction.

According to some examples, the method comprises: incrementing the data flow sequence number when sending a next data packet in the data flow, such that a data flow sequence number of a second data packet which is next in the data flow following the first data packet is one greater than the data flow sequence number of the first data packet.

According to some examples, the method comprises: sending a duplicate of the second data packet, wherein the duplicate of the second data packet comprises a same data flow identifier and a same data flow sequence number as the second data packet.

According to some examples, the method is performed by a Radio Access Network node and the sending is towards a User Plane Function.

According to some examples, the method is performed by a User Plane Function and the sending is towards a Radio Access Network node.

According to some examples, the method is performed by a first User Plane Function and the sending is towards a second User Plane Function.

According to some examples, a plurality of data packets are sent from at least two data flows.

According to some examples, the at least two data flows are Quality of Service flows.

According to a fifth aspect there is provided a computer program comprising instructions for causing an apparatus to perform at least the following: sending a first data packet comprising: a data flow identifier indicating a data flow which the first data packet belongs to; and a data flow sequence number indicating a position of the first data packet in a sequence of the data flow.

According to a sixth aspect there is provided a computer program comprising instructions stored thereon for performing at least the following: sending a first data packet comprising: a data flow identifier indicating a data flow which the first data packet belongs to; and a data flow sequence number indicating a position of the first data packet in a sequence of the data flow.

According to a seventh aspect there is provided a non-transitory computer readable medium comprising program instructions for causing an apparatus to perform at least the following: sending a first data packet comprising: a data flow identifier indicating a data flow which the first data packet belongs to; and a data flow sequence number indicating a position of the first data packet in a sequence of the data flow.

According to an eighth aspect there is provided a non-transitory computer readable medium comprising program instructions stored thereon for performing at least the following: sending a first data packet comprising: a data flow identifier indicating a data flow which the first data packet belongs to; and a data flow sequence number indicating a position of the first data packet in a sequence of the data flow.

According to a ninth aspect there is provided an apparatus comprising means for performing: receiving a first data packet comprising: a data flow identifier indicating a data flow which the first data packet belongs to; and a data flow sequence number indicating a position of the first data packet in a sequence of the data flow.

According to some examples, the means are further configured to perform: receiving a second data packet comprising: a data flow identifier indicating which data flow the second data packet belongs to; and a second data flow sequence number indicating the position of the second data packet in a sequence of the data flow; wherein the second data packet is received at a second time later than a first time at which the first data packet is received.

According to some examples, the means are further configured to perform: determining that the second data packet is a duplicate of the first data packet when the data flow identifier of the first data packet and the data flow identifier of the second data packet have a same value and the flow sequence number of the first data packet and the flow sequence number of the second data packet data have a same value; and not transmitting the second data packet further when the second data packet is a duplicate of the first data packet.

According to some examples, the means are further configured to perform: determining that the second data packet is next in the data flow after the first data packet when the data flow identifier of the first data packet and the data flow identifier of the second data packet have a same value and the data flow sequence number of the first data packet is one less than the data flow sequence number of the second data packet data; and transmitting the second data packet further when second data packet is the next in the data flow after the first data packet.

According to some examples, the first data packet and the second data packet are received over different data tunnel streams.

According to some examples, the first data packet comprises a Sequence Number Presence field.

According to some examples, the different data tunnel streams are different General Packet Radio Service Tunnelling Protocol streams.

According to some examples, the data flow is a Quality of Service flow.

According to some examples, the receiving the data packet comprises receiving a data packet from a downlink direction.

According to some examples, the receiving the data packet comprises receiving a data packet from an uplink direction.

According to some examples, the apparatus comprises a Radio Access Network node and the receiving is from a User Plane Function.

According to some examples, the apparatus comprises a User Plane Function and the receiving is from a Radio Access Network node.

According to some examples, the apparatus comprises a first User Plane Function and the receiving is from a second User Plane Function.

According to some examples, a plurality of data packets are received from at least two data flows.

According to some examples, the at least two data flows are Quality of Service flows.

According to a tenth aspect there is provided an apparatus comprising at least one processor; and at least one memory including computer program code; the at least one memory and the computer program code configured to, with the at least one processor, cause the apparatus at least to perform: receiving a first data packet comprising: a data flow identifier indicating a data flow which the first data packet belongs to; and a data flow sequence number indicating a position of the first data packet in a sequence of the data flow.

According to some examples, the at least one processor; and at least one memory including computer program code; the at least one memory and the computer program code configured to, with the at least one processor, cause the apparatus at least to perform: receiving a second data packet comprising: a data flow identifier indicating which data flow the second data packet belongs to; and a second data flow sequence number indicating the position of the second data packet in a sequence of the data flow; wherein the second data packet is received at a second time later than a first time at which the first data packet is received.

According to some examples, the at least one processor; and at least one memory including computer program code; the at least one memory and the computer program code configured to, with the at least one processor, cause the apparatus at least to perform: determining that the second data packet is a duplicate of the first data packet when the data flow identifier of the first data packet and the data flow identifier of the second data packet have a same value and the flow sequence number of the first data packet and the flow sequence number of the second data packet data have a same value; and not transmitting the second data packet further when the second data packet is a duplicate of the first data packet.

According to some examples, the at least one processor; and at least one memory including computer program code; the at least one memory and the computer program code configured to, with the at least one processor, cause the apparatus at least to perform: determining that the second data packet is next in the data flow after the first data packet when the data flow identifier of the first data packet and the data flow identifier of the second data packet have a same value and the data flow sequence number of the first data packet is one less than the data flow sequence number of the second data packet data; and transmitting the second data packet further when second data packet is the next in the data flow after the first data packet.

According to some examples, the first data packet and the second data packet are received over different data tunnel streams.

According to some examples, the first data packet comprises a Sequence Number Presence field.

According to some examples, the different data tunnel streams are different General Packet Radio Service Tunnelling Protocol streams.

According to some examples, the data flow is a Quality of Service flow.

According to some examples, the receiving the data packet comprises receiving a data packet from a downlink direction.

According to some examples, the receiving the data packet comprises receiving a data packet from an uplink direction.

According to some examples, the apparatus comprises a Radio Access Network node and the receiving is from a User Plane Function.

According to some examples, the apparatus comprises a User Plane Function and the receiving is from a Radio Access Network node.

According to some examples, the apparatus comprises a first User Plane Function and the receiving is from a second User Plane Function.

According to some examples, a plurality of data packets are received from at least two data flows.

According to some examples, the at least two data flows are Quality of Service flows.

According to a eleventh aspect there is provided an apparatus comprising: circuitry for: receiving a first data packet comprising: a data flow identifier indicating a data flow which the first data packet belongs to; and a data flow sequence number indicating a position of the first data packet in a sequence of the data flow.

According to a twelfth aspect there is provided a method comprising: receiving a first data packet comprising: a data flow identifier indicating a data flow which the first data packet belongs to; and a data flow sequence number indicating a position of the first data packet in a sequence of the data flow.

According to some examples, the method comprises: receiving a second data packet comprising: a data flow identifier indicating which data flow the second data packet belongs to; and a second data flow sequence number indicating the position of the second data packet in a sequence of the data flow; wherein the second data packet is received at a second time later than a first time at which the first data packet is received.

According to some examples, the method comprises: determining that the second data packet is a duplicate of the first data packet when the data flow identifier of the first data packet and the data flow identifier of the second data packet have a same value and the flow sequence number of the first data packet and the flow sequence number of the second data packet data have a same value; and not transmitting the second data packet further when the second data packet is a duplicate of the first data packet.

According to some examples, the method comprises: determining that the second data packet is next in the data flow after the first data packet when the data flow identifier of the first data packet and the data flow identifier of the second data packet have a same value and the data flow sequence number of the first data packet is one less than the data flow sequence number of the second data packet data;

and transmitting the second data packet further when second data packet is the next in the data flow after the first data packet.

According to some examples, the first data packet and the second data packet are received over different data tunnel streams.

According to some examples, the first data packet comprises a Sequence Number Presence field.

According to some examples, the different data tunnel streams are different General Packet Radio Service Tunnelling Protocol streams.

According to some examples, the data flow is a Quality of Service flow.

According to some examples, the receiving the data packet comprises receiving a data packet from a downlink direction.

According to some examples, the receiving the data packet comprises receiving a data packet from an uplink direction.

According to some examples, the method is performed by a Radio Access Network node and the receiving is from a User Plane Function.

According to some examples, the method is performed by a User Plane Function and the receiving is from a Radio Access Network node.

According to some examples, the method is performed by a first User Plane Function and the receiving is from a second User Plane Function.

According to some examples, a plurality of data packets are received from at least two data flows.

According to some examples, the at least two data flows are Quality of Service flows.

According to a thirteenth aspect there is provided a computer program comprising instructions for causing an apparatus to perform at least the following: receiving a first data packet comprising: a data flow identifier indicating a data flow which the first data packet belongs to; and a data flow sequence number indicating a position of the first data packet in a sequence of the data flow.

According to a fourteenth aspect there is provided a computer program comprising instructions stored thereon for performing at least the following: receiving a first data packet comprising: a data flow identifier indicating a data flow which the first data packet belongs to; and a data flow sequence number indicating a position of the first data packet in a sequence of the data flow.

According to a fifteenth aspect there is provided a non-transitory computer readable medium comprising program instructions for causing an apparatus to perform at least the following: receiving a first data packet comprising: a data flow identifier indicating a data flow which the first data packet belongs to; and a data flow sequence number indicating a position of the first data packet in a sequence of the data flow.

According to an sixteenth aspect there is provided a non-transitory computer readable medium comprising program instructions stored thereon for performing at least the following: receiving a first data packet comprising: a data flow identifier indicating a data flow which the first data packet belongs to; and a data flow sequence number indicating a position of the first data packet in a sequence of the data flow.

BRIEF DESCRIPTION OF FIGURES

The invention will now be described in further detail, by way of example only, with reference to the following examples and accompanying drawings, in which:

FIG. 8 shows a flow diagram of a method according to an example;

FIG. 9 shows a flow diagram of a method according to an example; and

DETAILED DESCRIPTION

Figure 1:
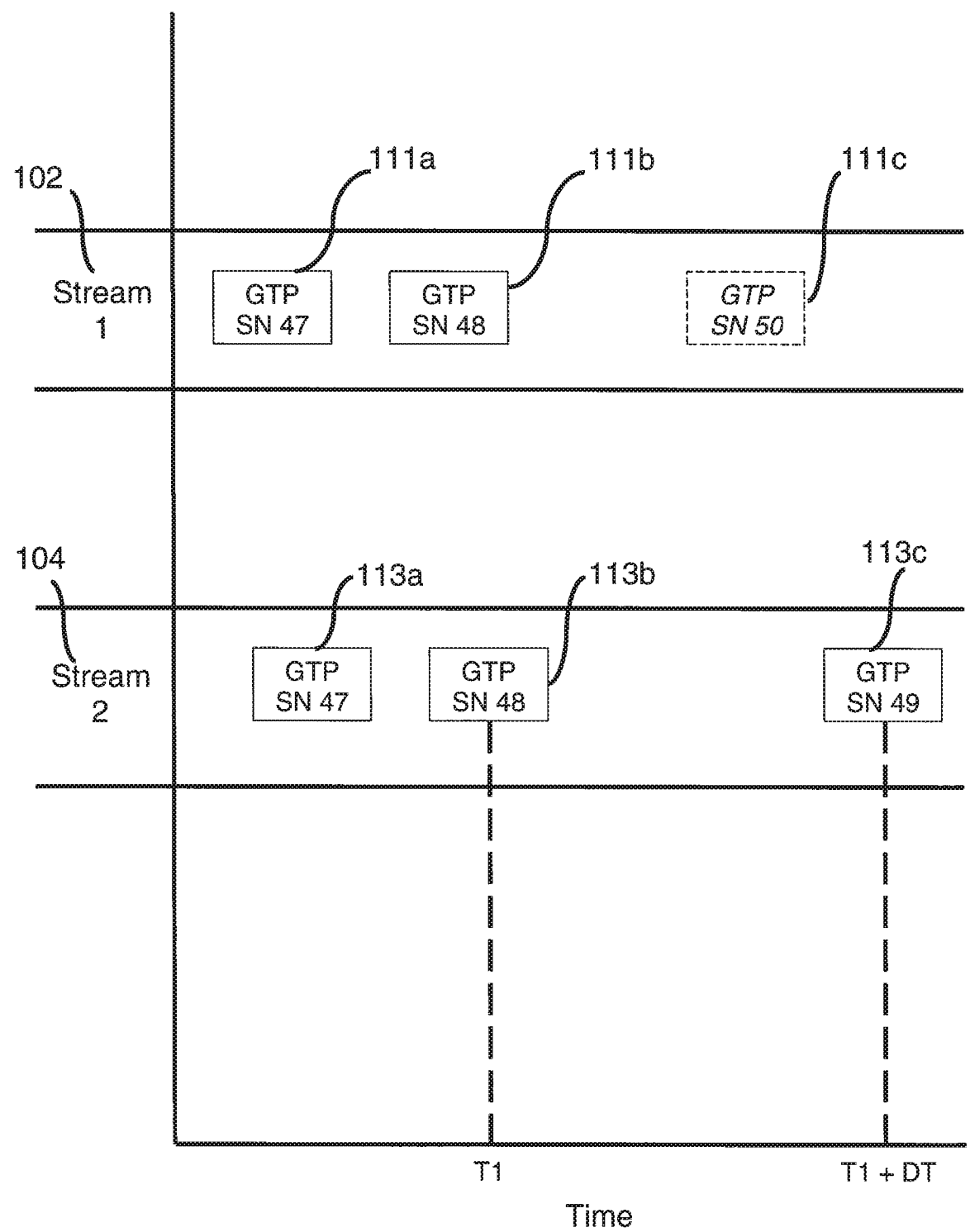
FIG. 1 shows a schematic representation of a method for data transmission.

The present disclosure relates to the transmission and reception of data in a wireless communication network. More particularly, some examples relate to redundant data transmission.

Some data flows require a high reliability of successful transmission. Examples of such data flows are Ultra-Reliable Low-Latency Communication (URLLC) data flows. In some case, a high reliability of successful transmission can be achieved by using redundant transmission on a user plane of a communications network, instead of using a single path on a user plane of a communications network.

A requirement to use redundant transmission on a user plane of a communications network instead of using a single path on a user plane of a communications network may arise due to conditions of network deployment. For example, due to certain network deployment configurations, some network segments may not meet a required standard of reliability.

For example, when a reliability requirement cannot be met on an N3 interface between a User Plane Function (UPF) and a NextGen Radio Access Network (NG-RAN) node in a network, data packets sent over a first General Packet Radio Service (GPRS) Tunnelling Protocol (GTP) tunnel can be duplicated over a second GTP tunnel. Similarly, when a reliability requirement cannot be met on an N9 interface between a User Plane Function (UPF) and a another UPF in a network, data packets sent over a first data tunnel can be duplicated over a second data tunnel. In some examples, the first and second GTP tunnels can traverse a different transport network.

In some examples, in a downlink (DL) direction a UPF of a network can send a packet over a nominal (first) GTP tunnel associated with a Protocol Data Unit (PDU) session while sending a duplicate of the packet in parallel over a second GTP tunnel associated to the same PDU session. At the NG-RAN node receiving the packets, the NG-RAN can consider the first arrived of the two packets for further transmission towards a User Equipment (UE) in the network. The NG-RAN node may also detect and eliminate the other packet of the two packets arriving at the NG-RAN node at a later time than the arrival time of the first of the two packets to arrive. In some examples, a UPF may send the data packets and duplicate data packets to a downlink UPF instead of a NG-RAN node.

A similar situation may occur in the uplink (UL) direction where the sender is the NG-RAN node and the receiver is the UPF. The NG-RAN node can send a packet over a nominal (first) GTP tunnel associated with a Protocol Data Unit (PDU) session while sending a duplicate of the packet in parallel over a second GTP tunnel associated to the same PDU session. At the UPF receiving the packets, the UPF can consider the first arrived of the two packets for further transmission in the network. The UPF may also detect and eliminate the other packet of the two packets arriving at the UPF at a later time than the arrival time of the first arrived of the two packets. In some examples, a UPF (instead of an NG-RAN node) may send the data packets and duplicate data packets to an uplink UPF.

In either of the DL or UL transmission examples, two GTP tunnels per PDU session may be enabled. In some examples, more than two GTP tunnels per PDU session may be enabled.

In some situations, one or more GTP packets may be assigned a GTP Sequence Number (SN). The GTP SN can be added in a GTP header of the GTP packet. GTP SNs can be used, for example, where there is a required standard of reliability of transmission of data packets. GTP SNs may also be used in URLLC data transmissions. GTP SNs can be used in both or either of the UL or DL direction in a network.

In some examples, when GTP SNs are used for data packets a packet and a duplicate of the packet are sent over two GTP tunnels with the same GTP SN.

For DL transmission, the UPF may send packets which require reliable or ultra-reliable transmission as a payload of GTP packets in which a GTP SN will be added in a GTP header. The UPF sends the packet and a duplicate of the packet over two different GTP tunnels with the same GTP SN. When the NG-RAN node receives the two packets it can identify from the GTP SN that they are duplicates. The NG-RAN will therefore only consider the packet which first arrives for further transmission towards a UE and it will eliminate the second packet when it arrives with the same GTP SN.

Redundant transmission may comprise sending a duplicate packet over a different GTP tunnel to an original packet. In more detail, considering the case of DL transmission/traffic, a UPF may replicate a packet from a Data Network and assign the same GTP SN to the original packet and the replica packet of the packets for the redundant transmission. In some examples, the two packets are transmitted to a NG-RAN via a N3 Tunnel 1 and a N3 Tunnel 2 separately. The NG-RAN can forward the packet received first from either tunnel towards the UE and can drop the later received packet which has the same GTP SN as the forwarded packet. Similarly, in the case of UL traffic, the NG-RAN may replicate the packet and assign the same GTP SN to them and the UPF can eliminate the later received redundant packet based on the GTP SN.

Redundant transmission can take place for each data flow for which duplication has been requested and/or set in a network. In some examples, these data flows can be considered as Quality of Service (QoS) flows.

FIG. 1 shows an example of redundant transmission. In the example, QoS flows 1, 2 and 3 are requested to be duplicated. These QoS flows may have different latency requirements. As shown in FIG. 1, a GTP SN can be added as described above as part of a GTP layer in the network. As shown in FIG. 1, an example of sequence numbers that may be transmitted via two GTP tunnels 102 and 104 is as follows:

GTP Tunnel Stream 1: GTP SN 47, GTP SN 48, GTP SN 50

GTP Tunnel Stream 2: GTP SN 47, GTP SN 48, GTP SN 49

For the purposes of explanation, this example may be considered as "Example A". In example A, the data packet having GTP SN 49 is lost on GTP Tunnel Stream 1 (shown as stream 102 in FIG. 1). In example A, packets 47 and 49 belong to QoS flow 1 and packets 48 and 50 belong to QoS flow 2. Packets 111*a*, 113*a* and 113*c* therefore belong to QoS flow 1, and packets 111*b*, 111*c* and 113*b* belong to QoS flow 2. No packets are transmitted from QoS flow 3 in the time period of this example. Assuming that the data packet 113*c* having GTP SN 49 is received on GTP Tunnel Stream 2 (shown as 104 in FIG. 1) after a waiting time DT, then in order to maintain an in-order delivery at the destination of the GTP Tunnel Streams the packet 111*c* having GTP SN 50 can be delayed by DT. Packet 111*c* having GTP SN 50 can then be received from GTP Tunnel Stream 1 (stream 102) after packet 113*c* having GTP SN 49 is received on GTP Tunnel Stream 2 (stream 104).

In some examples, instead of using GTP SNs as part of a GTP layer, a SN can be associated with (and managed with respect to) each QoS flow in a network. Such an example is shown in FIG. 2.

Figure 2:
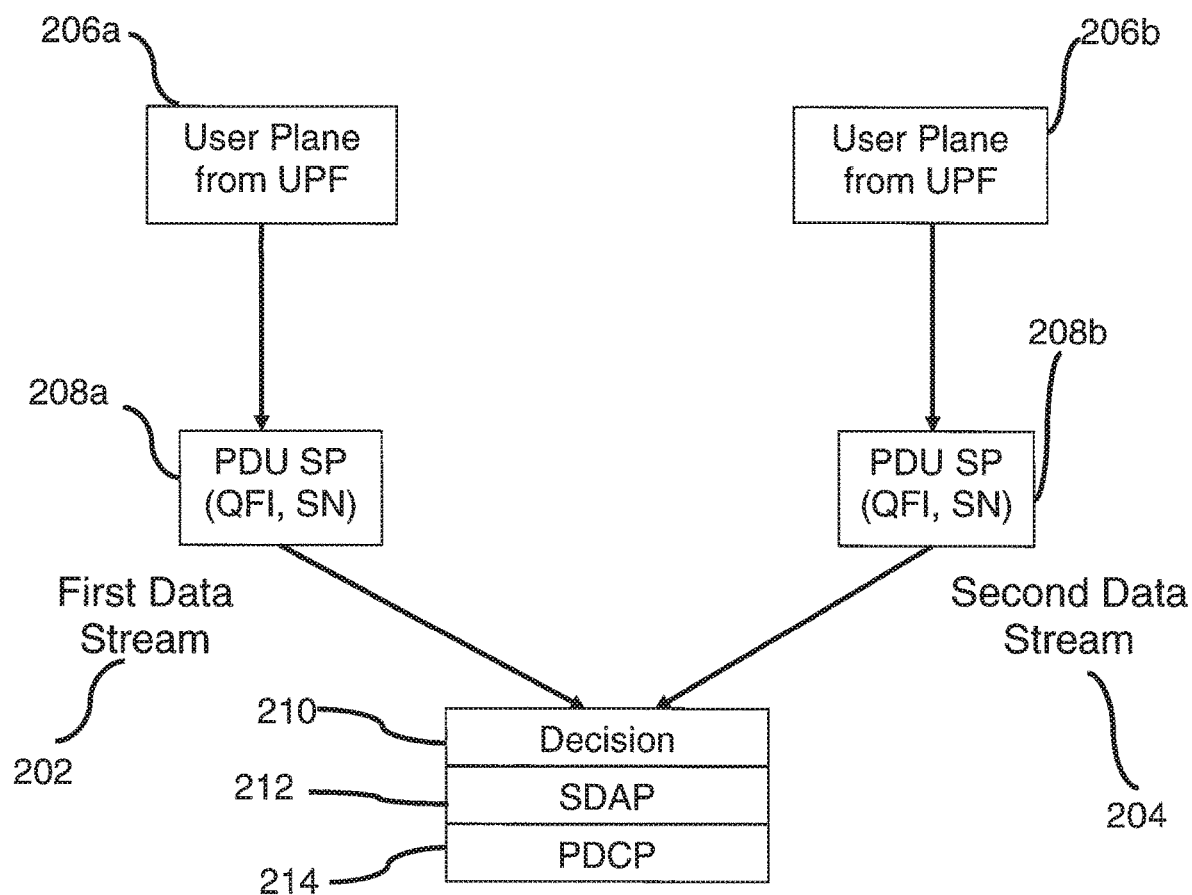
FIG. 2 shows a schematic representation of a method for sending data.

FIG. 2 shows a general protocol stack from duplicated PDU sessions and a decision mechanism as seen by the receiver during DL transmissions.

A first data stream is shown at 202 of FIG. 2. A second data stream is shown at 204 of FIG. 2. Data steam 202 may be sent over a first data tunnel, which may be a first GTP tunnel steam in some examples. Data stream 204 may be sent over a second data tunnel, which in some examples may be a second GTP tunnel stream.

At 206*a* and 206*b*, data is sent on each stream from the UPF of a network. As shown at 208*a* and 208*b*, each PDU Session (User Plane) Protocol (PDU SP) packet of the streams 202 and 204 is associated with a data flow identifier. A data flow identifier may comprise a QoS Flow Identifier (QFI).

As shown at 212 and 214, the Service Data Adaptation Protocol (SDAP) and Packet Data Convergence Protocol (PDCP) may make up a part (or all of) the protocol stack used at the receiver.

The data streams 202 and 204 are received at 210. The receiver may be, for example, an NG-RAN node. A decision can be made by the receiver at 210 as to which packets will be forwarded and which packets will be discarded, as discussed further below in more detail.

Figure 3:
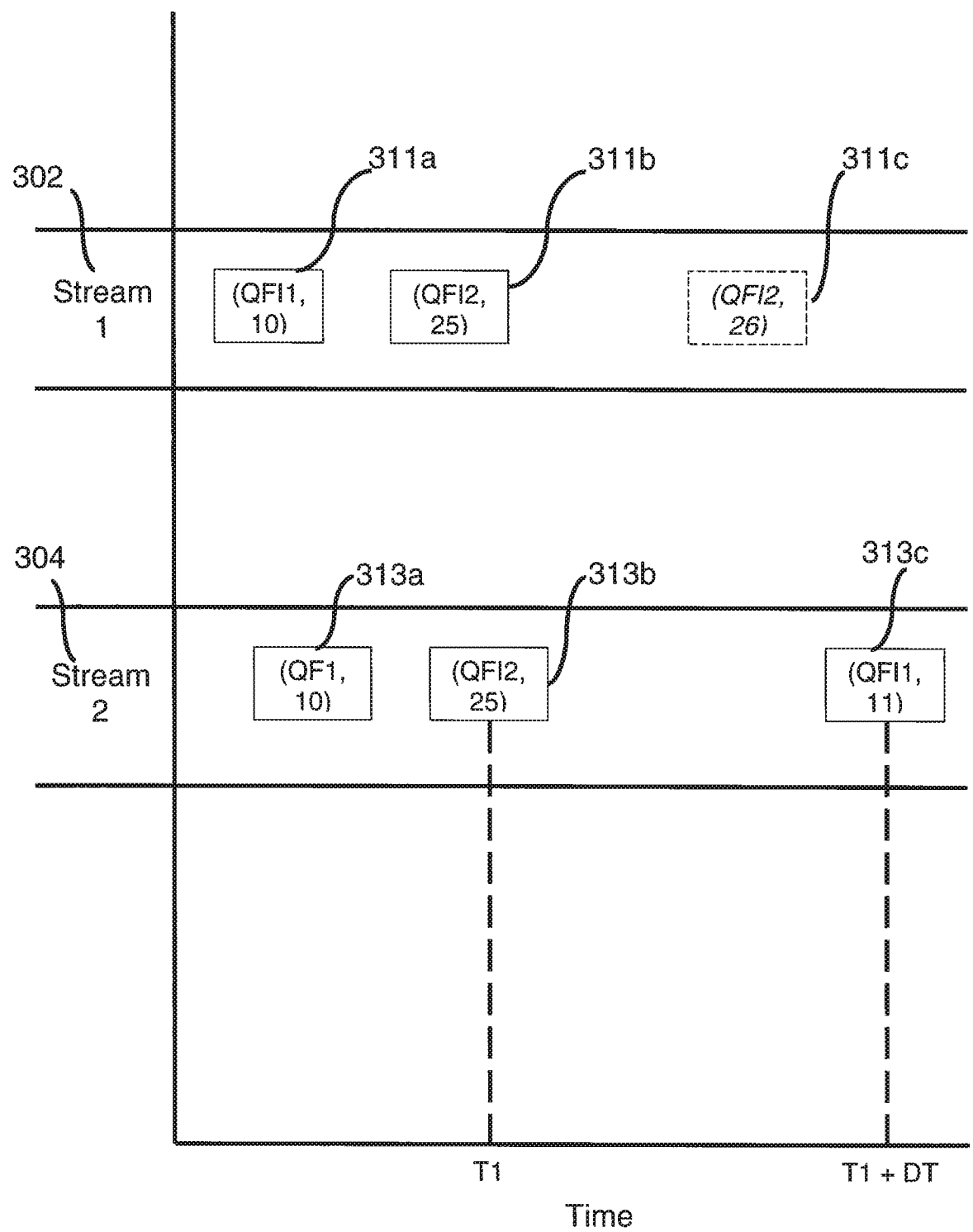
FIG. 3 shows a schematic representation of a method for data transmission.

FIG. 3 shows an example of redundant transmission. In this illustrative example, a situation where data packets arrive in the same order as in Example A is considered below. However, instead of using GTP SNs, a SN is associated with and managed with respect to each data flow in a network. A SN may be associated with and managed with respect to each QoS flow 302 and 304 in a network. For the purposes of differentiation, this example may be considered as "example B". A general protocol stack for duplicated PDU sessions and the decision mechanism 210 as seen by a receiver as shown in FIG. 2 may be used for example B.

In example B, the data packets will be received from data streams 302 and 304. As an example, data stream 302 may be considered to be GTP tunnel stream 1 and data stream 304 may be considered to be GTP tunnel stream 2. The data flow identifier QFIx and data flow sequence number SNy values of a data packet may be shown as (QFIx, SNy). In this example, arbitrary starting points for the value of y for each QFIx have been chosen. The data packets 311a, 311b, 311c, 313a, 313b and 313c will be received from the data streams with the following numbering chain (where the GTP SN that would have been assigned using the mechanism of example A is shown in square brackets):

GTP tunnel stream 1: (QFI1, 10) [=GTP SN 47 in example A]; (QFI2, 25) [=GTP SN 48 in example A]; (QFI2, 26) [=GTP SN 50 in example A]

GTP tunnel stream 2: (QFI1, 10) [=GTP SN 47 in example A]; (QFI2, 25) [=GTP SN 48 in example A]; (QFI1, 11) [=GTP SN 49 in example A]

In this example, similarly as to example A, the packet (QFI1, 11) is lost on the first tunnel stream 302 (using the sequence numbering of Example A, this packet would have been numbered as GTP SN 49). The lost packet (QFI1, 11) should have been received from GTP tunnel stream 1 between packet 311b (QFI2, 25) and packet 311c (QF2, 26). However instead of waiting to receive packet (QF1, 11) on GTP tunnel stream 2 before receiving packet 311c (QFI2, 26) on GTP tunnel stream 1, packet 311c (QFI2, 26) can be received after packet 311b (QFI2, 25) on GTP tunnel stream 1 without having to receive packet 313c (QFI1, 11) on GTP tunnel stream 2 while respecting in-order delivery of each QoS flow 1, 2 and 3.

Therefore, if there is a delay time DT in receiving the (QFI1, 11) packet 313c from GTP tunnel stream 2 after receiving the (QFI2, 25) packet 313b from GTP tunnel stream 1, the receiver does not have to wait a time DT to receive packet 313c (QFI2, 26) to respect in-order delivery of QoS flows 1 and 2. This is because the receiver is aware from the QFIs and SNs of the (QFI2, 25) and (QFI2, 26) packets 311b and 311c that these packets are from the same the QoS flow and that in-order delivery of the QoS flow is being respected (because SN=26 follows SN=25). Delay to QoS flow 2 (labelled as 304 in FIG. 3) is therefore avoided.

Although Examples A and B are described above in relation to DL transmission, similar mechanisms and sequence numbering could be used for UL transmission (for example, from an NG-RAN node to a UPF).

Figure 4:
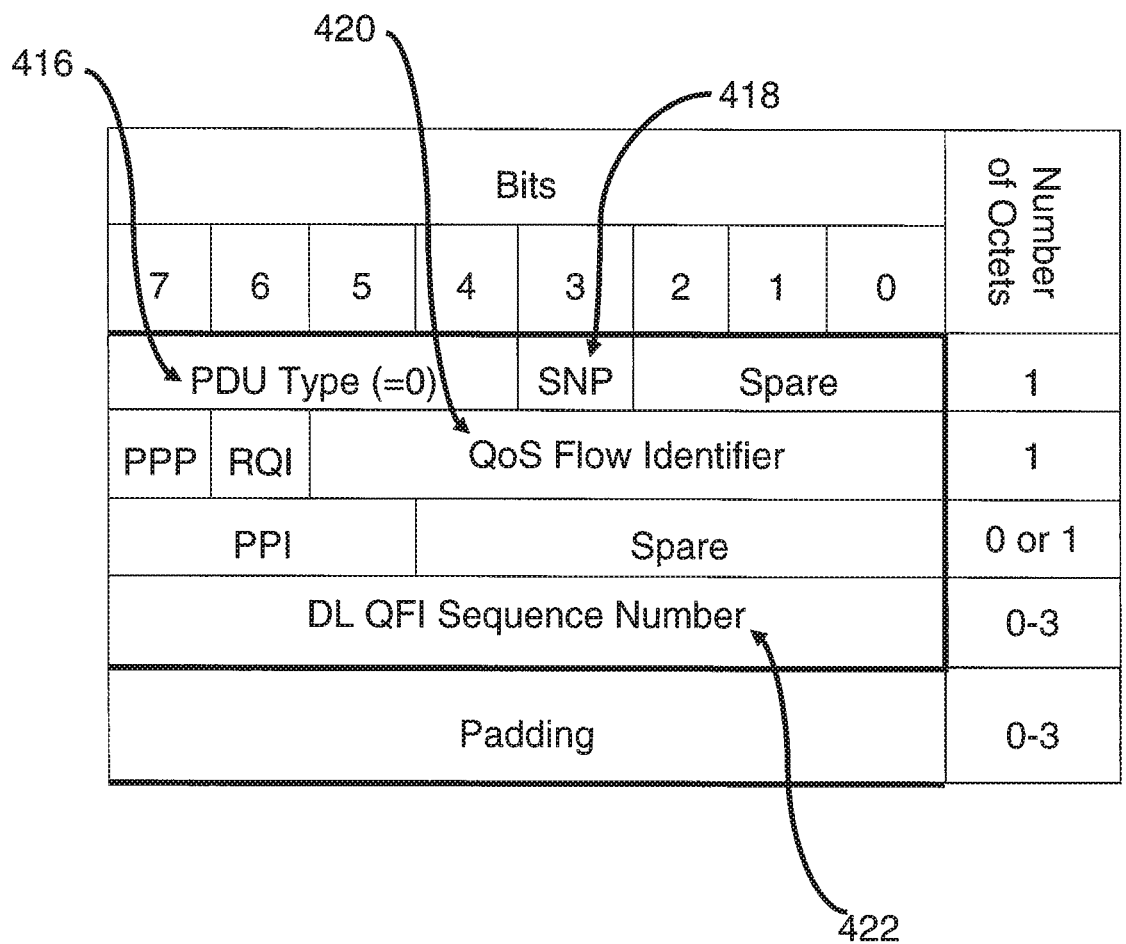
FIG. 4 shows an example message format for sending and/or receiving data.

FIG. 4 shows an example of a DL PDU Session Information (PDU Type 0) Format. The DL PDU Session Information (PDU Type 0) Format could be used for packets sent according to Example B described above.

As shown in FIG. 4, the DL PDU Session Information (PDU Type 0) Format may comprise a field 416 indicating a PDU frame type of "0".

At 422, FIG. 4 further shows a field named "DL QFI Sequence Number" in the frame type 0 of the DL PDU Session Information frame format. In some examples, this field may comprise 3 bytes. At 420, FIG. 4 also shows that the DL QFI Sequence Number 422 is associated in the same frame as a QoS Flow Identifier (QFI) 420. QFI field 420 may be in an octet above the DL QFI Sequence Number 422 and can be used to identify to which QoS flow a packet belongs to. The DL QFI Sequence Number can then be associated and managed per QoS flow i.e. incremented if the next packet to be sent corresponds to same QoS flow. The DL QFI Sequence Number parameter may be assigned by the UPF or NG-RAN node associated with a given QoS flow. The DL QFI Sequence Number parameter may have a field length of 3 octets. Furthermore, the DL QFI Sequence Number parameter may in some examples have a value range between 0 and $2^{24}$-1.

In some examples, and as shown in FIG. 4, an optional Sequence Number Presence (SNP) field 418 can also be included in order to indicate to a receiver that a DL QFI Sequence Number is present. In some examples, a value of 0 may indicate that a DL QFI Sequence Number is not present and a value of 1 may indicate that a DL QFI Sequence Number is present. The SNP parameter may have a field length of 1 bit, for example.

In some examples, only data packets of QoS flows in a PDU session eligible for redundant transmission are marked with a DL QFI Sequence Number.

As shown in FIG. 4, the DL PDU Session Information (PDU Type 0) Format may also comprise further fields such as one or more "Spare" fields, a Point-to-Point Protocol (PPP) field, a Reflective QoS Indication (RQI) field, a Payload Protocol Identifier (PPI) field and a "Padding" field. The number of bits and number of octets of these fields are also shown in the illustrative example of FIG. 4.

Figure 5:
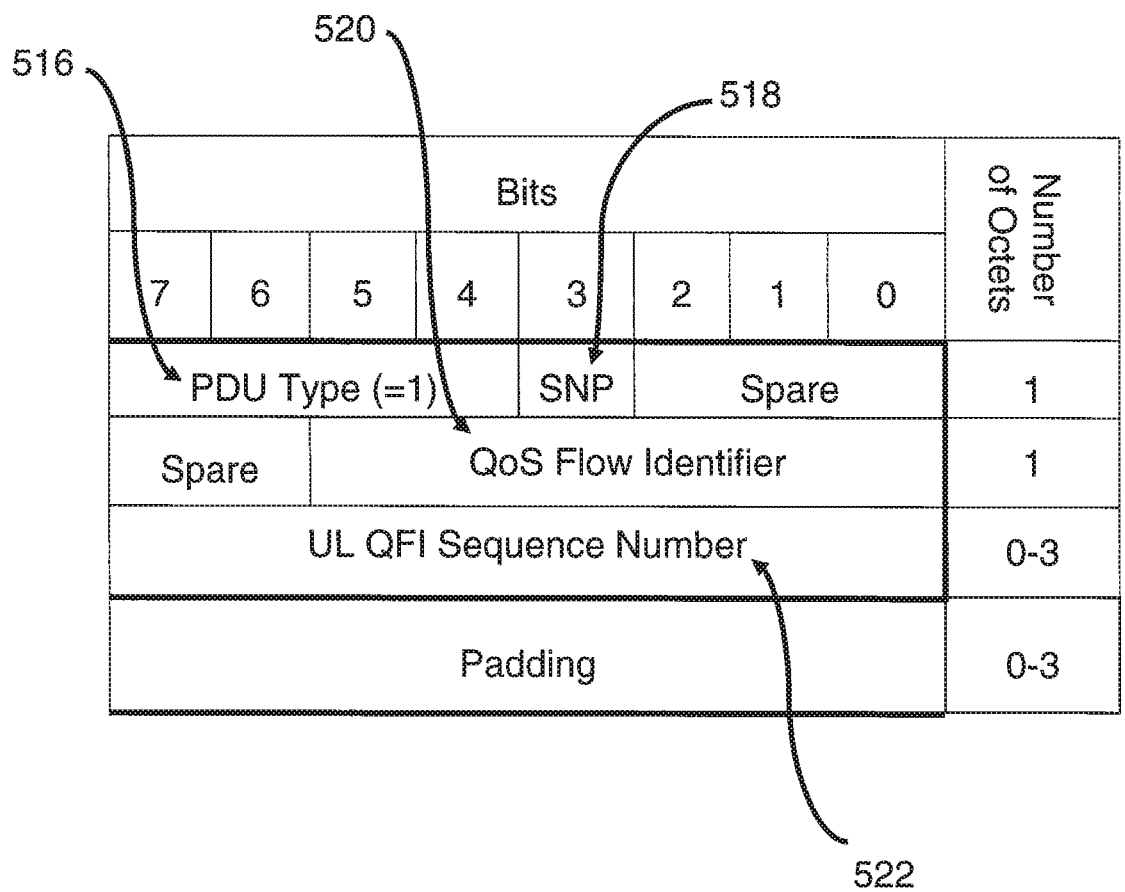
FIG. 5 shows an example message format for sending and/or receiving data.

FIG. 5 shows an example of an UL PDU Session Information (PDU Type 1) Format. The UL PDU Session Information (PDU Type 1) Format could be used for packets sent similarly as according to Example B described above, although in an UL direction.

As shown in FIG. 5, the UL PDU Session Information (PDU Type 1) Format may comprise a field 516 indicating a PDU frame type of "1".

At 522, FIG. 5 further shows a field named "UL QFI Sequence Number" in the frame type 1 of the UL PDU Session Information frame format. In some examples, this field may comprise 3 bytes. At 520, FIG. 5 also shows that the UL QFI Sequence Number 522 is associated in the same frame as a QoS Flow Identifier (QFI) 520. QFI field 520 may be in an octet above the UL QFI Sequence Number 522 and can be used to identify to which QoS flow a packet belongs to. The UL QFI Sequence Number can then be associated and managed per QoS flow i.e. incremented if the next packet to be sent corresponds to same QoS flow. The UL QFI Sequence Number parameter may be assigned by the NG-RAN node or by a UPF function associated with a given QoS flow. The UL QFI Sequence Number parameter may have a field length of between 0 and 3 octets. Furthermore, the UL QFI Sequence Number parameter may in some examples have a value range between 0 and $2^{24}$-1.

In some examples, and as shown in FIG. 5, an optional SNP field 518 can also be included in order to indicate to a receiver that a UL QFI Sequence Number is present. In some examples, a value of 0 may indicate that a UL QFI Sequence Number is not present and a value of 1 may indicate that a UL QFI Sequence Number is present. The SNP parameter may have a field length of 1 bit, for example.

In some examples, only QoS flows in a PDU session eligible for redundant transmission are marked with a UL QFI Sequence Number.

As shown in FIG. 5, the UL PDU Session Information (PDU Type 1) Format may also comprise further fields such as "Spare" fields and "Padding" fields. The number of bits and number of octets of these fields are also shown in the illustrative example of FIG. 5.

Figure 6:
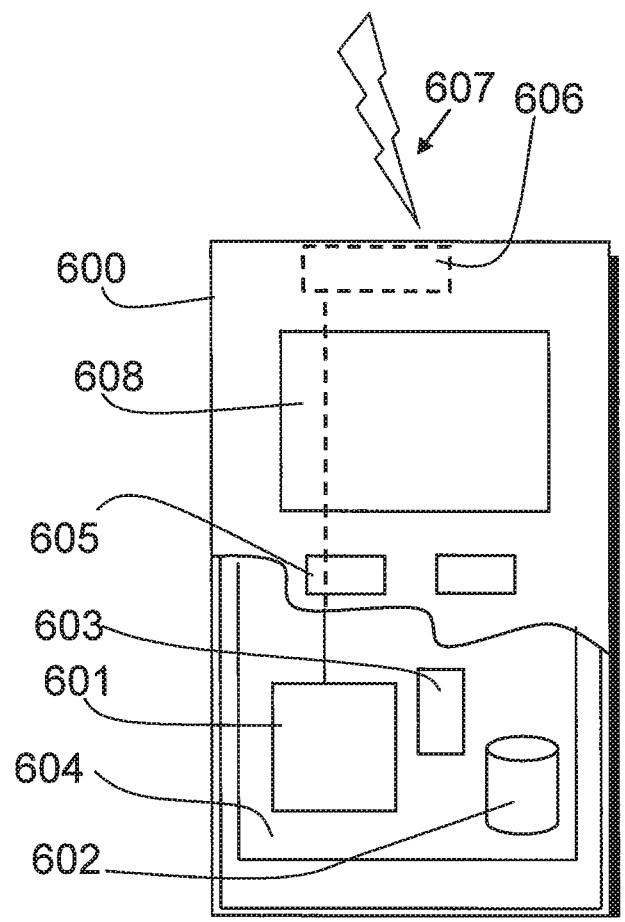
FIG. 6 shows a schematic representation of an apparatus according to an example.

In some of the examples described above, data packets are sent between a UPF and NG-RAN node. Data packets could also be sent in a similar way between a first UPF and a second UPF A possible wireless communication device will now be described in more detail with reference to FIG. 6 showing a schematic, partially sectioned view of a communication device 600. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 600 may receive signals over an air or radio interface 607 via appropriate apparatus for receiving and may transmit signals via appropriate apparatus for transmitting radio signals. In FIG. 6 transceiver apparatus is designated schematically by block 606. The transceiver apparatus 606 may be provided for example by means of a radio part and associated antenna arrangement. The antenna arrangement may be arranged internally or externally to the wireless device.

A wireless device is typically provided with at least one data processing entity 601, at least one memory 602 and other possible components 603 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 604. The user may control the operation of the wireless device by means of a suitable user interface such as key pad 605, voice commands, touch sensitive screen or pad, combinations thereof or the like. A display 608, a speaker and a microphone can be also provided. Furthermore, a wireless communication device may comprise appropriate connectors (either wired or wireless) to other devices and/or for connecting external accessories, for example hands-free equipment, thereto. The communication devices 602, 604, 605 may access the communication system based on various access techniques.

Figure 7:
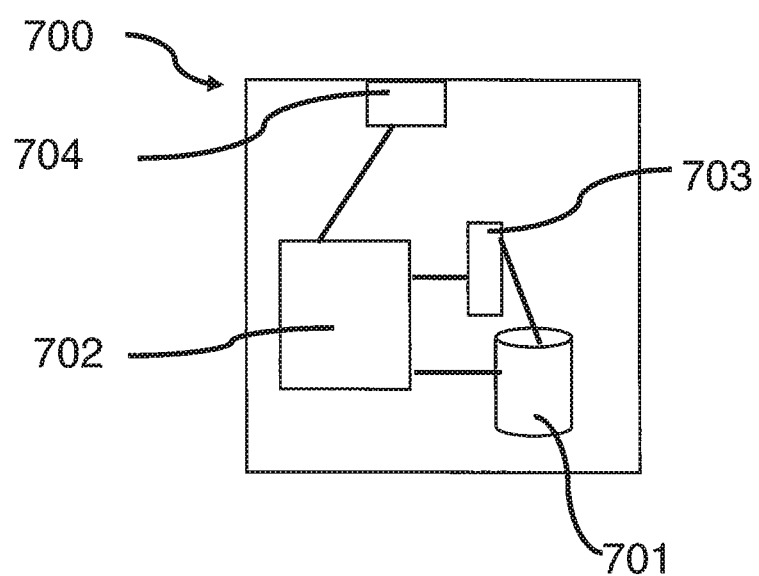
FIG. 7 shows a schematic representation of an apparatus according to an example.

FIG. 7 shows an example of a control apparatus 700 for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, or an IAB or relay node. The apparatus 700 may be coupled to an NG-RAN node, or to a part of a UPF. The control apparatus may be integrated with or external to a node or module of a core network or RAN. In some example embodiments, base stations comprise a separate control apparatus unit or module. In other example embodiments, the control apparatus can be another network element such as a radio network controller or a spectrum controller. In some example embodiments, each base station may have such a control apparatus as well as a control apparatus being provided in a radio network controller. The control apparatus 700 can be arranged to provide control on communications in the service area of the system. The control apparatus 700 comprises at least one memory 701, at least one data processing unit 702, 703 and an input/output interface 704. Via the interface the control apparatus can be coupled to a receiver and a transmitter of the base station. The receiver and/or the transmitter may be implemented as a radio front end or a remote radio head. For example the control apparatus 700 or processor 701 can be configured to execute an appropriate software code to provide the control functions.

FIG. 8 is a flow chart of a method according to an example. The flow chart of FIG. 8 is viewed from the perspective of an apparatus such as, for example, an NG-RAN node or a UPF. S801 of FIG. 8 comprises sending a first data packet, the first data packet comprising: a data flow identifier indicating a data flow which the first data packet belongs to; and a data flow sequence number indicating a position of the first data packet in a sequence of the data flow.

FIG. 9 is a flow chart of a method according to an example. The flow chart of FIG. 9 is viewed from the perspective of an apparatus such as, for example, an NG-RAN node or a UPF. S901 of FIG. 9 comprises receiving a first data packet, the first data packet comprising: a data flow identifier indicating a data flow which the first data packet belongs to; and a data flow sequence number indicating a position of the first data packet in a sequence of the data flow.

Figure 10:
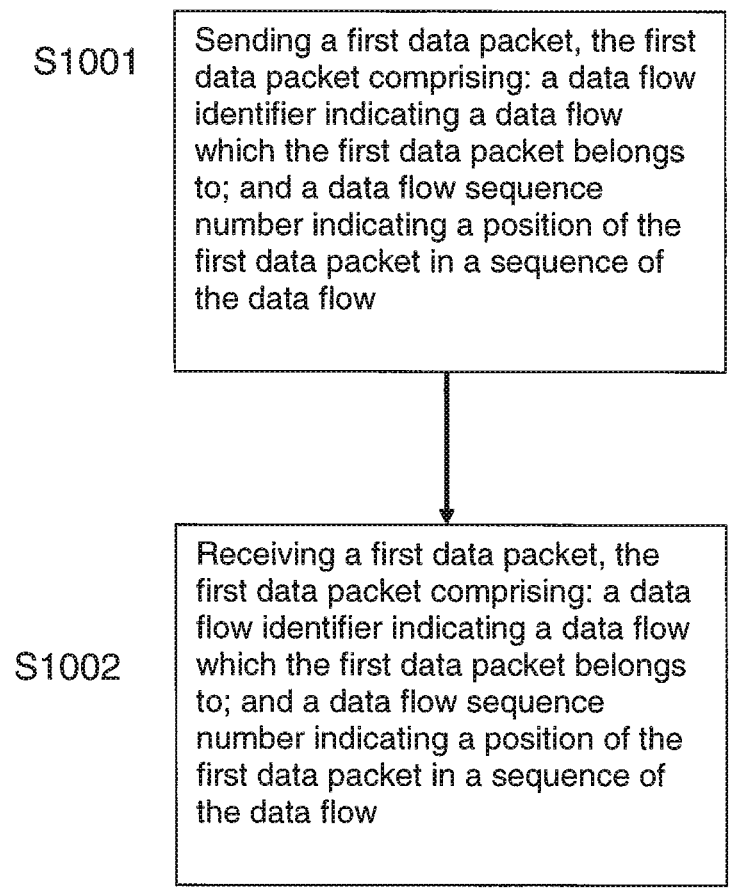
FIG. 10 shows a flow diagram of a method according to an example.

FIG. 10 is a flow chart of a method according to an example. The flow chart of FIG. 10 may be performed by a system. S1001 of FIG. 10 comprises sending a first data packet, the first data packet comprising: a data flow identifier indicating a data flow which the first data packet belongs to; and a data flow sequence number indicating a position of the first data packet in a sequence of the data flow. S1001 may be performed by an apparatus such as a NG-RAN node or a UPF in the system. S1002 comprises receiving a first data packet, the first data packet comprising: a data flow identifier indicating a data flow which the first data packet belongs to; and a data flow sequence number indicating a position of the first data packet in a sequence of the data flow. S1002 may be performed by an apparatus in the system other than the apparatus that does not perform S1001. S1002 may be performed by a UPF in the case that S1001 is performed by a NG-RAN node. In the case S1001 is performed by a UPF, S1002 may be performed by a different UPF or by a NG-RAN node.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The example embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out example embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further exemplary embodiments comprising a combination of one or more exemplary embodiments with any of the other exemplary embodiments previously discussed.

That which is claimed is:

1. An apparatus comprising at least one processor and at least one memory including computer program code, the at least one memory and computer program code configured to, with the at least one processor, cause the apparatus to:
   cause a first quality of service (QoS) flow to be transmitted in sequence between first and second network nodes via a first General Packet Radio Service Tunneling Protocol (GTP) tunnel associated with a Protocol Data Unit (PDU) session; and
   cause a second QoS flow to be transmitted in sequence between the first and second network nodes via a second GTP tunnel associated with the PDU session, wherein the second QoS flow is redundant to the first QoS flow and the data packets of the second QoS flow are duplicated data packets of the data packets of the first QoS flow,
   wherein the first and second QoS flows each comprise data packets, wherein respective data packets of the first and second QoS flows comprise:
     a Sequence Number Presence field;
     a data flow identifier indicating a QoS flow to which the respective data packet belongs; and
     a data flow sequence number added to a GTP header or an extension header by one of a network base station or a user plane function (UPF), indicating a position of the respective data packet in the sequence of the QoS flow within the PDU session, wherein a duplicated data packet of the second QoS flow comprises a same data flow identifier and a same data flow sequence number in the GTP header or the extension header as a respective data packet of the first QoS flow.

2. The apparatus according to claim 1, wherein the at least one memory and computer program code are further configured to, with the at least one processor, cause the apparatus to cause a first plurality of QoS flows including the first QoS flow to be transmitted via the first GTP tunnel and to cause a second plurality of QoS flows including the second QoS flow to be transmitted via the second GTP tunnel, and wherein the second plurality of QoS flows have been requested or set for duplication and are redundant to respective QoS flows of the first plurality of QoS flows.

3. The apparatus according to claim 1, wherein the at least one memory and computer program code are further configured to, with the at least one processor, cause the apparatus to cause a first plurality of QoS flows including the first QoS flow to be transmitted via the first GTP tunnel and to cause a second plurality of QoS flows including the second QoS flow to be transmitted via the second GTP tunnel, and wherein the second plurality of QoS flows are redundant to respective QoS flows of the first plurality of QoS flows with the second plurality of QoS flows being only the QoS flows that are eligible for redundant transmission.

4. The apparatus according to claim 1, wherein the at least one memory and computer program code are further configured to, with the at least one processor, cause the apparatus to increment the data flow sequence number for a next data packet of the first QoS flow that is sent following the respective data packet, such that a data flow sequence number of the next data packet which is next in the first QoS flow following the respective data packet is one greater than the data flow sequence number of the respective data packet.

5. An apparatus comprising at least one processor and at least one memory including computer program code, the at least one memory and computer program code configured to, with the at least one processor, cause the apparatus to:
receive a first quality of service (QoS) flow in sequence via a first General Packet Radio Service Tunneling Protocol (GTP) tunnel between first and second network nodes and associated with a Protocol Data Unit (PDU) session; and
receive a second QoS flow in sequence via a second GTP tunnel between the first and second network nodes and associated with the PDU session, wherein the second QoS flow is redundant to the first QoS flow and the data packets of the second QoS flow are duplicated data packets of the data packets of the first QoS flow,
wherein the first and second QoS flows each comprise data packets, wherein respective data packets of the first and second QoS flows comprise:
a Sequence Number Presence field;
a data flow identifier indicating a QoS flow to which the respective data packet belongs; and
a data flow sequence number in a GTP header or an extension header, indicating a position of the respective data packet in the sequence of the QoS flow within the PDU session; and
wherein at least one duplicative packet in the first and second QoS flows have the same data flow identifier and the same data flow sequence number in the GTP header or the extension header.

6. The apparatus according to claim 5, wherein the at least one memory and computer program code are further configured to, with the at least one processor, cause the apparatus to receive a first plurality of QoS flows including the first QoS flow via the first tunnel and to receive a second plurality of QoS flows including the second QoS flow via the second tunnel, and wherein the second plurality of QoS flows have been requested or set for duplication and are redundant to respective QoS flows of the first plurality of QoS flows.

7. The apparatus according to claim 5, wherein the at least one memory and computer program code are further configured to, with the at least one processor, cause the apparatus to receive a first plurality of QoS flows including the first QoS flow via the first tunnel and to receive a second plurality of QoS flows including the second QoS flow via the second tunnel, and wherein the second plurality of QoS flows are redundant to respective QoS flows of the first plurality of QoS flows with the second plurality of QoS flows being only the QoS flows that are eligible for redundant transmission.

8. The apparatus according to claim 5, wherein the at least one memory and computer program code are further configured to, with the at least one processor, cause the apparatus to:
determine that a data packet of one of the first QoS flow or the second QoS flow is a duplicated data packet of a respective data packet of another one of the first QoS flow or the second QoS flow which has been received by the apparatus in an instance in which: (i) the data flow identifier of the respective data packet has a same value as a data flow identifier of the duplicated data packet and (ii) the flow sequence number of the respective data packet has a same value as a flow sequence number in the GTP header or the extension header of the duplicated data packet; and
not further transmit the data packet of the one of the first QoS flow or the second QoS flow in an instance in which the data packet is a duplicate of the respective data packet.

9. The apparatus according to claim 5, wherein the data flow sequence number for a second data packet of one of the first QoS flow or the second QoS flow that is sent following the respective data packet is incremented relative to the data flow sequence number for the respective data packet, such that a data flow sequence number of the second data packet which is next in the one of the first QoS flow or the QoS flow following the respective data packet is one greater than the data flow sequence number of the respective data packet.

10. The apparatus according to claim 9, wherein the at least one memory and computer program code are further configured to, with the at least one processor, cause the apparatus to:
determine that the second data packet is next in the one of the first QoS flow or the second QoS flow after the respective data packet when the data flow identifier of the respective data packet and the data flow identifier of the second data packet have a same value and the data flow sequence number of the respective data packet is one less than the data flow sequence number of the second data packet; and
cause the second data packet to be further transmitted in an instance in which the second data packet is determined to be next in the one of the first QoS flow or the second QoS flow after the respective data packet.

11. A method comprising:
causing a first quality of service (QoS) flow to be transmitted in sequence between first and second network nodes via a first General Packet Radio Service Tunneling Protocol (GTP) tunnel associated with a Protocol Data Unit (PDU) session; and
causing a second QoS flow to be transmitted in sequence between the first and second network nodes via a second GTP tunnel associated with the PDU session, wherein the second QoS flow is redundant to the first QoS flow and the data packets of the second QoS flow are duplicated data packets of the data packets of the first QoS flow,
wherein the first and second QoS flows each comprise data packets, wherein respective data packets of the first and second QoS flows comprise:
a Sequence Number Presence field;
a data flow identifier indicating a QoS flow to which the respective data packet belongs; and
a data flow sequence number added to a GTP header or an extension header by one of a network base station or a user plane function (UPF), indicating a position of the respective data packet in the sequence of the QoS flow within the PDU session, wherein a duplicated data packet of the second QoS flow comprises a same data flow identifier and a same data flow sequence number in the GTP header or the extension header as a respective data packet of the first QoS flow.

12. A method comprising:
- receiving a first quality of service (QoS) flow in sequence via a first General Packet Radio Service Tunneling Protocol (GTP) tunnel between first and second network nodes and associated with a PDU session; and
- receiving a second QoS flow in sequence via a second GTP tunnel between the first and second network nodes and associated with the PDU session, wherein the second QoS flow is redundant to the first QoS flow and the data packets of the second QoS flow are duplicated data packets of the data packets of the first QoS flow,
- wherein the first and second QoS flows each comprise data packets, wherein respective data packets of the first and second QoS flows comprise:
  - a Sequence Number Presence field;
  - a data flow identifier indicating a QoS flow to which the respective data packet belongs; and
  - a data flow sequence number in a GTP header or an extension header indicating a position of the respective data packet in the sequence of the QoS flow within the PDU session; and
- wherein at least one duplicative packet in the first and second QoS flows have the same data flow identifier and the same data flow sequence number in the GTP header or the extension header.

13. The method according to claim 12, further comprising:
- determining that a data packet of one of the first QoS flow or the second QoS flow is a duplicated data packet of a respective data packet of another one of the first QoS flow or the second QoS flow in an instance in which: (i) the data flow identifier of the respective data packet has a same value as a data flow identifier of the duplicated data packet and (ii) the flow sequence number of the respective data packet has a same value as a flow sequence number of the duplicated data packet; and
- not further transmitting the data packet of the one of the first QoS flow or the second QoS flow in an instance in which the data packet is a duplicate of the respective data packet.

* * * * *